US008745351B2

(12) United States Patent
Scales et al.

(10) Patent No.: US 8,745,351 B2
(45) Date of Patent: Jun. 3, 2014

(54) INITIALIZING FILE DATA BLOCKS (71) Applicant: VMware, Inc., Palo Alto, CA (US)

(72) Inventors: Daniel J. Scales, Mountain View, CA (US); Satyam B. Vaghani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/797,335

(22) Filed: Mar. 12, 2013

(65) Prior Publication Data

US 2013/0198246 A1    Aug. 1, 2013

Related U.S. Application Data (63) Continuation of application No. 12/050,805, filed on Mar. 18, 2008, now Pat. No. 8,397,038.

(60) Provisional application No. 60/896,453, filed on Mar. 22, 2007.

(51) Int. Cl.
G06F 12/00       (2006.01)

(52) U.S. Cl.
USPC ............................. 711/166; 711/202

(58) Field of Classification Search
CPC . G06F 12/0246; G06F 13/18; G06F 12/1027; G06F 12/0292
USPC .................. 711/156, 158, 202, 205, 206, 166
See application file for complete search history.

(56) References Cited

U.S. PATENT DOCUMENTS

| | | | |
|---|---|---|---|
| 5,943,689 A | 8/1999 | Tamer | |
| 6,145,017 A | 11/2000 | Ghaffari | |
| 6,938,059 B2 * | 8/2005 | Tamer et al. | ............. 1/1 |
| 7,464,243 B2 | 12/2008 | Haridas et al. | |
| 2002/0059287 A1 | 5/2002 | Karasudani et al. | |
| 2003/0130986 A1 | 7/2003 | Tamer et al. | |
| 2004/0064474 A1 | 4/2004 | Hitz et al. | |
| 2004/0088294 A1 | 5/2004 | Lerhaupt | |
| 2004/0221102 A1 * | 11/2004 | Watanabe | ........ 711/112 |
| 2006/0155667 A1 * | 7/2006 | Tolba | ........... 707/1 |
| 2007/0136387 A1 | 6/2007 | Malueg et al. | |

* cited by examiner

*Primary Examiner* — Gurtej Bansal (57) ABSTRACT

A method and system is provided for initializing files such as, for example and without limitation, pre-allocated files or raw device mapping (RDM) files, by delaying initializing file blocks. In accordance with one or more embodiments of the present invention, file blocks are associated with corresponding indicators to track un-initialized blocks.

14 Claims, 8 Drawing Sheets

DELAYED BLOCK ZEROING ON WRITES

INITIALIZING FILE DATA BLOCKS

CROSS-REFERENCE TO RELATED APPLICATIONS

This application is a continuation of U.S. patent application Ser. No. 12/050,805 filed on Mar. 18, 2008, now issued as U.S. Pat. No. 8,397,038, and entitled "Initializing File Data Blocks," which claims the benefit of U.S. Provisional Application No. 60/896,453, filed Mar. 22, 2007, both of which are incorporated herein by reference in their entirety.

FIELD OF THE INVENTION

One or more embodiments of the present invention relate to a file system of a computer system and, in particular, to a method and system for initializing file data blocks.

BACKGROUND

Figure 1:
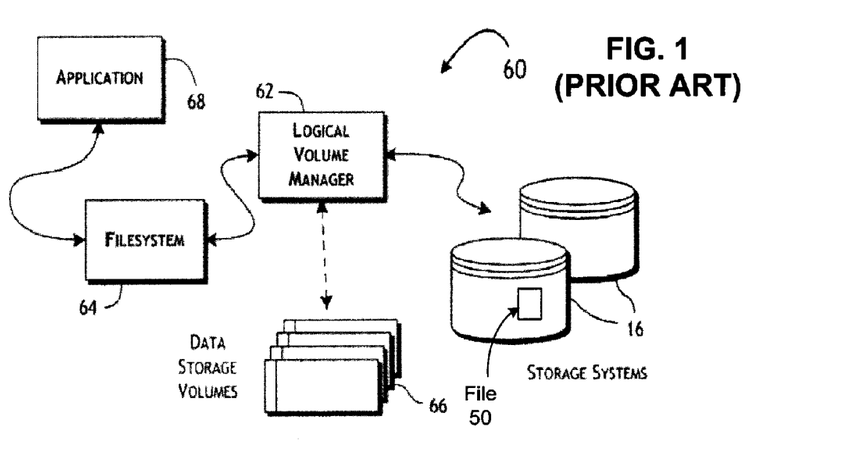
FIG. 1 is a block diagram illustrating a conventional distributed file system and logical volume management architecture of a computer system.

FIG. 1 is a block diagram illustrating a conventional distributed file system and logical volume management architecture of a computer system. As shown in FIG. 1, logical volume manager 62 (at a system tier above network storage systems 16) is implemented as a software layer beneath local file system layer 64. Network storage systems 16 (e.g., disks) store data that are arranged in files 50. By executing logical volume manager 62, local file system layer 64 is presented with a data storage view represented by one or more discrete data storage volumes 66, each of which is capable of containing a complete file system data structure. The specific form and format of the file system data structure is determined by the particular file system layer 64 employed. For example, physical file systems, including the New Technology Filesystem (NTFS), the Unix Filesystem (UFS), the VMware Virtual Machine Filesystem (VMFS), and the Linux Third Extended Filesystem (ext3FS), may be used as file system layer 64.

As is conventional for logical volume managers, each of data storage volumes 66 is functionally constructed by logical volume manager 62 from an administratively defined set of one or more data storage units representing LUNs (Logical Units). Where LUN storage, at least relative to logical volume manager 62, is provided by network storage systems 16, data storage volumes 66 are assembled from an identified set of data storage units externally presented by network storage systems 16. That is, logical volume manager 62 is responsible for functionally managing and distributing data transfer operations to various data storage units of particular target data storage volumes 66. The operation of logical volume manager 62 is transparent to application 68 executed directly by a computer system or by clients of the computer system.

Figure 2A:
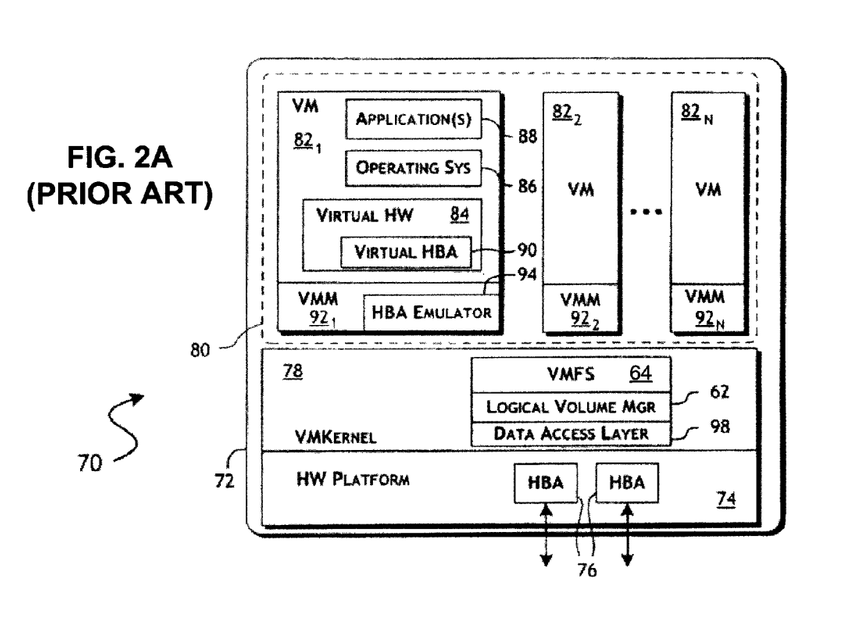
FIG. 2A is an architectural block diagram showing a file system and logical volume manager in a virtualized computer system.

FIG. 2A is an architectural block diagram showing a file system and logical volume manager in a virtual machine based or virtualized computer system 72. Computer system 72 is constructed on a conventional, typically server-class, hardware platform 74 that includes host bus adapters 76 (HBA 76) in addition to conventional platform processor, memory, and other standard peripheral components (not separately shown). Hardware platform 74 is used to execute virtual machine operating system 78 (VMKernel 78) that supports virtual machine execution space 80 within which virtual machines $82_1$-$82_N$ (VMs $82_1$-$82_N$) are executed. Virtual machine operating system 78 provides services and support to enable concurrent execution of VMs $82_1$-$82_N$. In turn, each of VMs $82_1$-$82_N$ implements a virtual hardware platform (for example, virtual HW 84) that supports execution of a guest operating system (for example, guest operating system 86) and one or more client application programs (for example, application(s) 88). The guest operating systems may be instances of Microsoft Windows, Linux or Netware-based operating systems. Other guest operating systems can be equivalently used. In each instance, guest operating system 86 includes a native filesystem layer, typically either an NTFS or ext3FS type filesystem layer. These filesystem layers interface with virtual hardware platforms 84 to access, from the perspective of the guest operating systems, a data storage host bus adapter (HBA). The virtual hardware platforms (for example, virtual HW 84) implement virtual host bus adapters (for example, virtual HBA 90) that provide the appearance of the necessary system hardware support to enable execution of the guest operating systems transparent to the virtualization of the system hardware.

Filesystem calls initiated by the guest operating system to implement filesystem-related data transfer and control operations are processed and passed through the virtual HBAs (for example, virtual HBA 90) to adjunct virtual machine monitor layers (for example, VMM $92_1$-$92_N$) that implement virtual system support necessary to coordinate operation with VMKernel 78. In particular, a host bus adapter emulator (for example, HBA emulator 94) functionally enables data transfer and control operations to be ultimately passed to HBAs 76. System calls implementing data transfer and control operations are passed to virtual machine filesystem 64 (VMFS 64) for coordinated implementation with respect to ongoing operation of all of VMs $82_1$-$82_N$. That is, the native filesystems of the guest operating systems perform command and data transfer operations against virtual SCSI (Small Computer System Interface) devices presenting LUNs visible to the guest operating systems. These virtual SCSI devices are based on emulated LUNs actually maintained as files resident within storage space managed by VMFS 64. In this respect, VMFS 64 is to VMs $82_1$-$82_N$ what storage system 16 (shown in FIG. 1) is to hardware platform 74. Permitted guest operating system command and data transfer operations against the emulated LUNs are mapped between LUNs visible to the guest operating systems and data storage volumes visible to VMFS 64. A further mapping is, in turn, performed by a VMKernel-based logical volume manager 62 to LUNs visible to logical volume manager 62 through data access layer 98, including device drivers (not specifically shown in FIG. 2A), and HBAs 76.

Figure 2B:
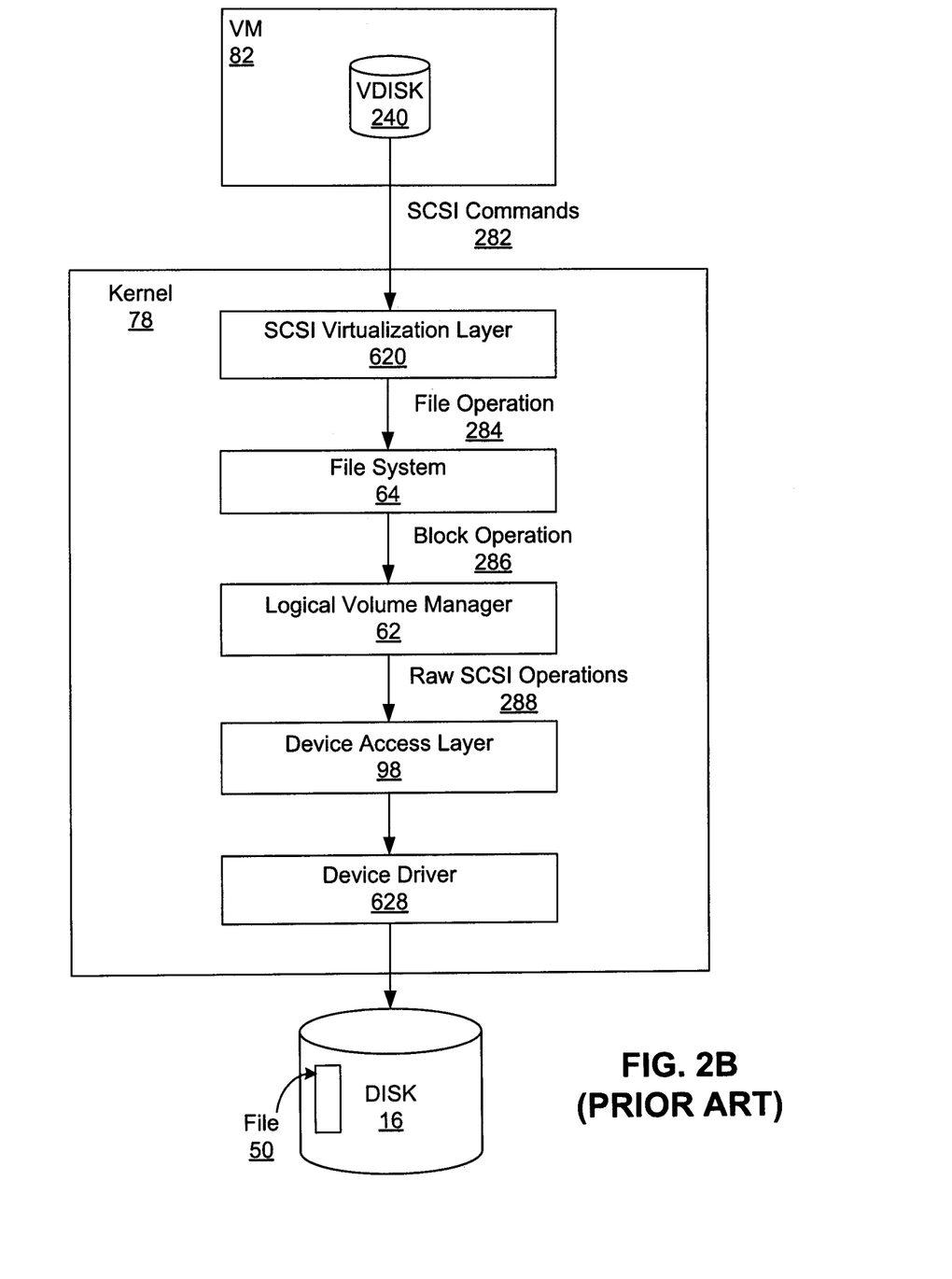
FIG. 2B shows how a file system manages access to files stored on a disk in a virtualized computer system.

As explained above, in a virtualized computer system or any other type of computer system, a file system is typically required to provide pre-allocated (i.e., pre-grown) files to support sophisticated applications like databases, virtual machines, etc. FIG. 2B shows how a file system manages access to files stored on a disk in a virtualized computer system in more detail. In FIG. 2B, it is assumed that disk 16 is a SCSI disk accessed through a SCSI interface, although other interfaces may be used to access disk 16. VMKernel 78 of virtualized computer system 72 includes SCSI virtualization layer 620, file system 64, logical volume manager 62, device access layer 98, and device driver 628 to manage access of files 50 on disk 16.

As indicated by FIG. 2B, an application running on VM 82 that is accessing virtual disk 240 issues SCSI commands 282 to SCSI virtualization layer 620. In response, SCSI virtualization layer 620 issues file operations 284 to file system 64 based on SCSI commands 282, and in response, file system 64 converts file operations 284 to block operations 286 and provides block operations 286 to logical volume manager 62 (file system 64 manages creation, use, and deletion of files 50 stored on disk 16). In response, logical volume manager 62 issues raw SCSI operations 288 to device access layer 98 based on block operations 286. In response, device access layer 98 discovers physical storage devices such as disk 16 on a SAN (Storage Area Network) or inside a local server, and applies command queuing and scheduling policies to raw SCSI operations 288. Device driver 628 understands the input/output interface of HBA 76 (FIG. 2A) which interfaces with disk 16, and sends raw SCSI operations 288 received from device access layer 98 to HBA 76 to be forwarded to disk 16. Device driver 628 also manages HBA 76 directly and disk 16 indirectly, and is used by VMkernel 78 for interacting with HBA 76. Finally, file 50 residing on disk 16 is accessed.

Figure 3:
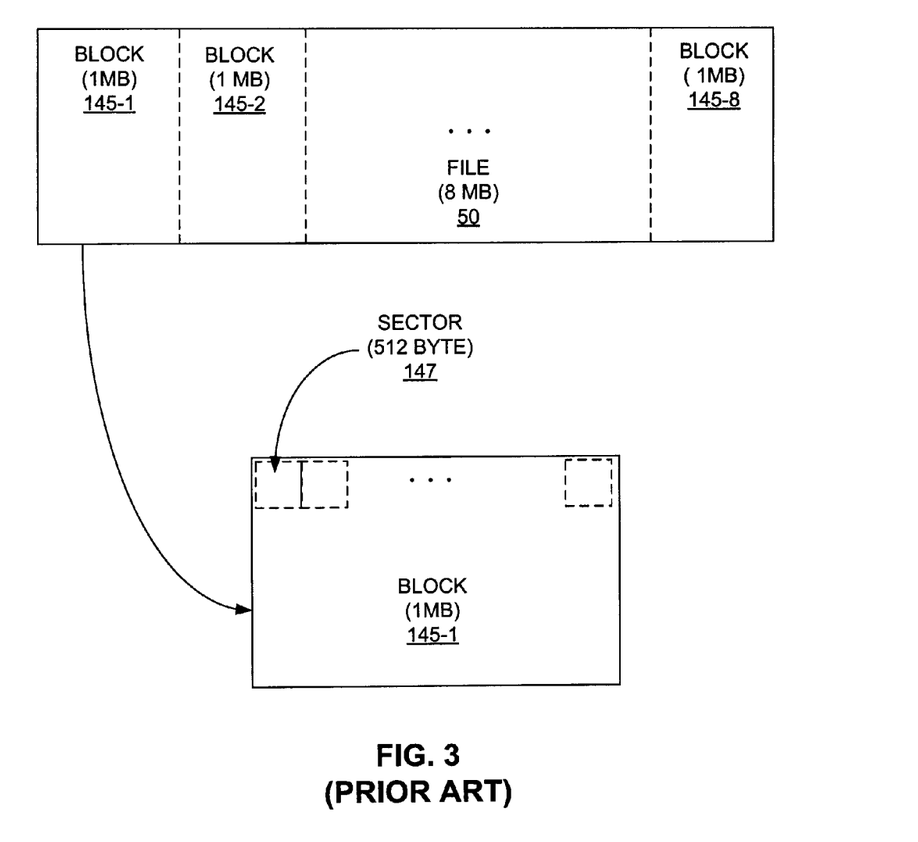
FIG. 3 shows a structure of a pre-allocated file stored on a disk.

FIG. 3 shows a structure of a pre-allocated file stored on a disk. A pre-allocated file is a file that is grown to a given size at the time of creation by reserving a requested number of file blocks (disk space) at creation time. For example, file 50 in FIG. 3 is pre-allocated with a file size of 8 MByte, comprised of 8 blocks 145-1, 145-2, . . . , 145-8; each with a size of 1 MByte. Each block 145-1 is comprised of sectors 147 that have a size of, for example, 512 bytes. Although FIG. 3 illustrates contiguous blocks 145-1, 145-2, . . . , 145-8, the blocks of the file 50 may not necessarily be contiguous.

Pre-allocated files are useful for a variety of reasons. First, disk space is guaranteed for a pre-allocated file, and thus there is reduced risk or no risk of an application running out of disk space at runtime because all required space is reserved at the time the pre-allocated file is created. Second, performance of an application using a pre-allocated file is enhanced because file system 64 (refer to FIG. 1 or to VMFS 64 of FIG. 2A) does not need to do block allocation and corresponding metadata IO (Input/Output) to change a file length as the application accesses newer regions of the file. Third, pre-allocated files typically have reduced fragmentation because all file blocks are allocated at the same time and file system 64 can place those allocated blocks belonging to the same file as close to each other as possible. As such, the pre-allocated file has a high chance of using contiguous blocks on disk.

A disadvantage of pre-allocated files is that file system 64 needs to initialize (for example, zero out) all blocks of the file. If the blocks are not zeroed out, application 68 using file 50 (refer to FIG. 1) will be able to access stale data remaining on disk 16. This is not desirable for security and application isolation. If blocks are not zeroed out before they are accessed by a new application, a malicious application may read and interpret stale data that was written in the context of another application, much after that other application was terminated and its file is removed from the file system. This security vulnerability is similar to the case where an application or computer system uses an unwiped (unscrubbed) hard disk 16 that belonged to another application or computer system. It is exacerbated in the case of pre-allocated files because of the relatively dynamic nature of file system block allocation as compared to hard disks.

Conventional file systems typically zero out all the blocks of a pre-allocated file when the pre-allocated file is created. However, zeroing out an entire file by doing disk writes at time of creation of a pre-allocated file is expensive, time-consuming, and ineffective for performance of the computer system because of the disk IO operations that required to zero out the blocks. This is impractical for creating large pre-allocated files in the GByte range, which is very common among databases and VM types of applications. In addition, it can be wasteful because parts of the pre-allocated file that the application may never access are also zeroed out.

SUMMARY OF THE INVENTION

A method and system is provided for initializing files such as, for example and without limitation, pre-allocated files or raw device mapping (RDM) files, by delaying initializing file blocks. In accordance with one or more embodiments of the present invention, file blocks are associated with corresponding indicators to track un-initialized blocks.

DETAILED DESCRIPTION

Figure 4:
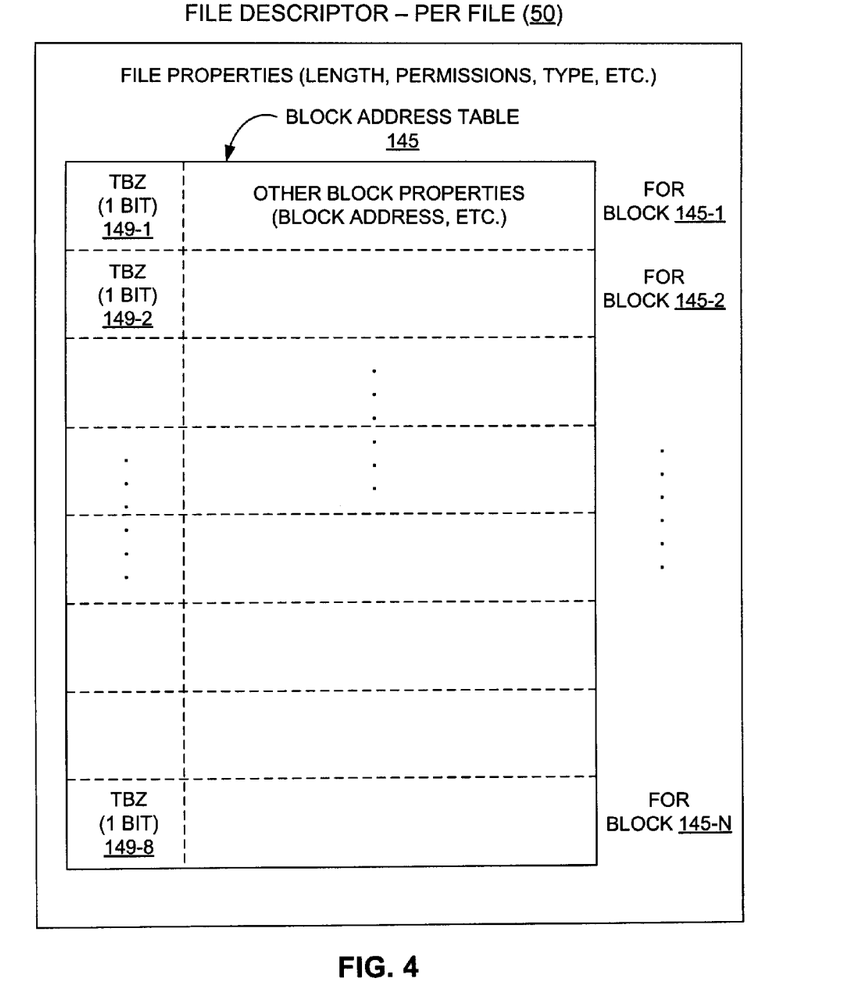
FIG. 4 shows a structure of a file descriptor of a pre-allocated file, according to one or more embodiments of the present invention.

FIG. 4 shows a structure of a file descriptor of a pre-allocated file, according to one or more embodiments of the present invention. The file descriptor is a data structure used by a file system (for example filesystem 64 of FIG. 1 or VMFS 64 of FIG. 2A) to manage various properties (e.g., length, permissions, type, etc.) of the file. In accordance with one or more such embodiments, each file 50 has a corresponding file descriptor. The file descriptor includes block address table 145 that contains a list of block addresses corresponding to data blocks allocated to the file, for example, as in a conventional file system. In addition, in accordance with one or more embodiments of the present invention, block address table 145 stores To-Be-Zeroed bits (TBZ bits) 149-1, 149-2, . . . , 149-N per block. Each TBZ bit 149-1, 149-2, . . . , 149-N is a 1 bit flag indicating whether the corresponding block is a TBZ block, i.e., a block to be initialized (for example, zeroed). The terms initialized or zeroed, as used herein, refer to setting values of data, for example, in a block, (preferably all data values in the block) to "predictable" values such as, for example and without limitation, 0. In accordance with one or more such embodiments, the values for a particular block need not be all the same. Setting the TBZ bit (e.g., setting it "1") for a file block indicates that the corresponding file block has never been written to by the application associated with the pre-allocated file, or in other words, that the corresponding block may contain garbage if read from physical media and is to be zeroed. Thus, the contents of the corresponding block should be zeroed before they are read from disk 16. If the TBZ bit is not set, this means that the corresponding file block has been written to by the application associated with the pre-allocated file. Its contents have been zeroed (if necessary), and thus it is safe to read data from that block. When the pre-allocated file is created, the TBZ bits corresponding to all blocks that are allocated but not zeroed are set.

With use of TBZ bits in the file descriptor corresponding to blocks of the pre-allocated file, it is possible to delay zeroing of blocks of pre-allocated files to some extent, according to one or more embodiments of the present invention. Delayed zeroing of the blocks can be carried out using a variety of methods, including without limitation: (1) a synchronous block zeroing on first write (LZ-S1) method; (2) an asynchronous block zeroing on first write (LZ-A1) method; (3) a delayed synchronous block zeroing on writes (LZ-SD) method; and (4) a delayed asynchronous block zeroing on writes (LZ-AD) method, any one of which methods can be combined with speculative block zeroing to implement zeroing of blocks in the form of: (5) a speculative synchronous block zeroing on writes (LZ-SS) method; or (6) a speculative asynchronous block zeroing on writes (LZ-AS) method. Each of these methods is described in detail below with reference to FIGS. 5-7.

Block Zeroing on First Write

Figure 5:
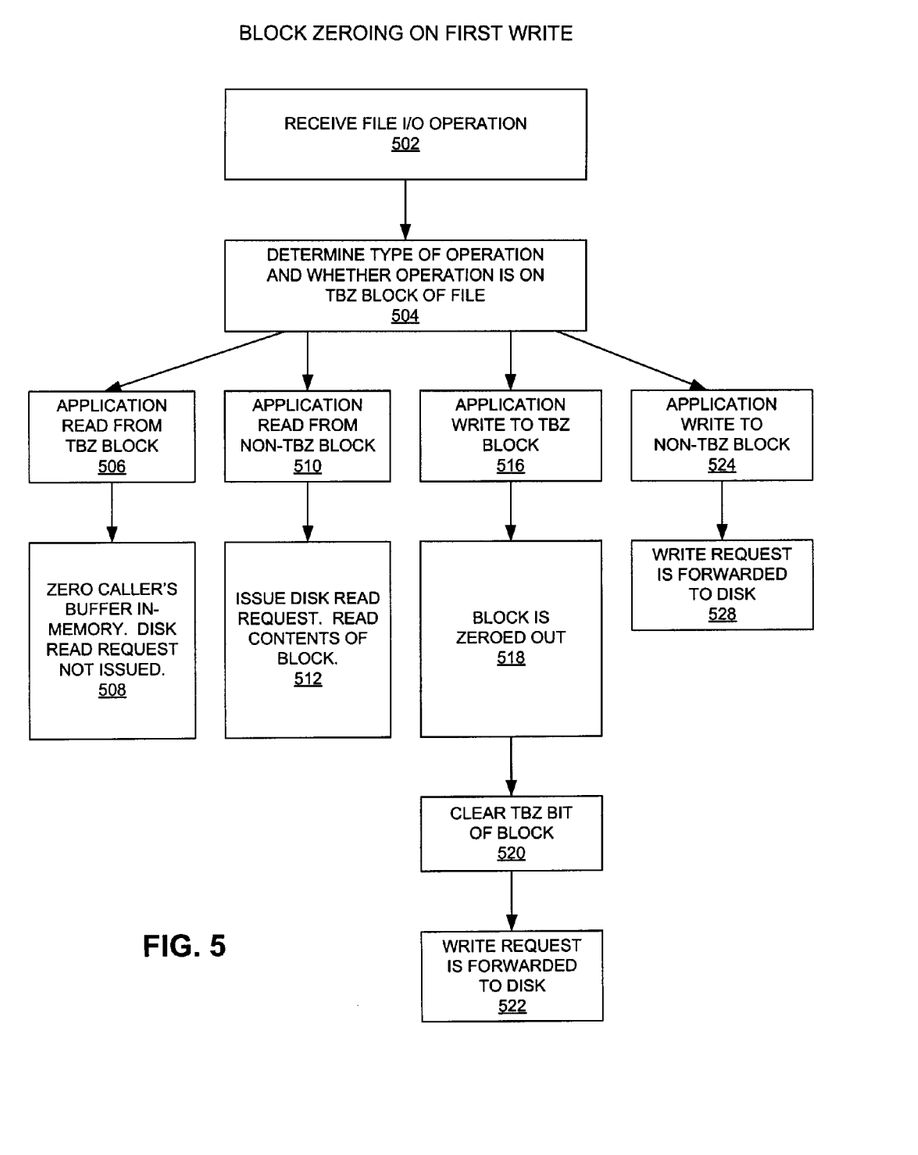
FIG. 5 is a flow chart that illustrates how one or more embodiments operate in accordance with a first aspect of the present invention, i.e., a Block Zeroing on First Write method of zeroing blocks of a pre-allocated file.

FIG. 5 is a flow chart that illustrates how one or more embodiments operate in accordance with a first aspect of the present invention, i.e., a Block Zeroing on First Write method of zeroing blocks of a pre-allocated file. According to the Block Zeroing on First Write method, block(s) are not zeroed when a pre-allocated file is created, but entire block(s) are zeroed out when an application first writes to the block(s). The Block Zeroing on First Write method may be embodied in a variety of ways, including, without limitation, a Synchronous Block Zeroing on First Write (LZ-S1) method and an Asynchronous Block Zeroing on First Write (LZ-A1) method, either of which can be combined with Speculative Block Zeroing. In the following description, it is assumed that a pre-allocated file is created without its blocks being zeroed at the time the pre-allocated file is created, and that TBZ bits corresponding to blocks of the file are set.

Synchronous Block Zeroing on First Write (LZ-S1)

In accordance with one or more embodiments of the present invention, the Block Zeroing on First Write method of FIG. 5 is carried out by file system 64 of FIG. 1 or VMFS 64 of FIG. 2A. Referring to FIG. 5, at step 502, a file I/O operation request is received. At step 504, the type of operation requested and whether the requested operation relates to a to-be-zeroed (TBZ) block of the file (i.e., whether the TBZ bit corresponding to the block to be accessed is set) is determined. Note that the file I/O operation could span multiple blocks of file 50. In such case, the file I/O operation may be split up before step 504, and the remaining steps of the method shown in FIG. 5 may be performed with respect to each fragment of the split up file I/O operation.

At step 506, if the file I/O operation is an application read from a TBZ block, the application read is serviced at step 508 by zeroing the caller's buffer in-memory. A disk read request is not issued because the TBZ block has never been written to and may contain data from another application. On the other hand, at step 510, if the file I/O operation is an application read from a non-TBZ block, at step 512, the application read is serviced by reading the contents of the block, i.e., a disk read request is issued.

At step 516, if the file I/O operation is an application write to a TBZ block, at step 518, the block is zeroed out while the write request is held, for example, in VMKernel 78. In accordance with the LZ-S1 method, the block is zeroed out synchronously in the caller's context. "Synchronously" herein means that the caller's context is blocked on the I/O operation, and is not scheduled on a CPU until the I/O operation is completed successfully or unsuccessfully. If the zeroing operation of step 518 succeeds, at step 520 the TBZ bit corresponding to the block is cleared (for example, reset); in the LZ-S1 method, this occurs synchronously in the caller's context. If the TBZ bit is cleared successfully, then, at step 522, the original application write request is forwarded to disk 16 to be written to file 50. On the other hand, at step 524, if the file I/O operation is an application write to a non-TBZ block, at step 528, the application write request is forwarded to disk 16 so that it is written to the file.

Asynchronous Block Zeroing on First Write (LZ-A1):

The LZ-A1 method is an embodiment of an asynchronous version of the Block Zeroing on First Write method. In accordance with the LZ-A1 method, block zeroing and corresponding metadata changes are performed via asynchronous I/O so that a caller application is not blocked during zeroing operations. Otherwise, the same steps for the method of FIG. 5 as explained above with respect to the LZ-S1 method are carried out for the LZ-A1 method.

Note that the asynchronous block zeroing method requires that asynchronous zero writes to un-initialized blocks not be executed out of order with respect to application writes to the same region on disk 16 (if asynchronous zero writes were executed out of order, application writes might be overwritten incorrectly with zero writes). To this end, a causal chain of I/O operations resulting from a single application I/O call (e.g., the write request of step 516) is established and issued in a crash consistent order. Thus, in the LZ-A1 method (unlike the LZ-S1 method), given an application write to a TBZ block at step 516 that would trigger zeroing of blocks, steps 518 and 520 are performed by issuing asynchronous requests corresponding to these steps, i.e., steps 518 and 520. For example, at step 518, an asynchronous request to zero the block is issued in the LZ-A1 method (rather than a synchronous request in the caller's context as is the case in the LZ-S1 method). Therefore, the caller's context is free to do other work while zeroing is being performed at step 518. When the zero write is completed at step 518, a notification is issued, and, at step 520, a subsequent I/O request to clear the TBZ bit is issued asynchronously. Again, the caller's context is free to do other work while clearing the TBZ bit of the block at step 520. On successful completion of step 520, at step 522, the original application write request is finally forwarded to disk 16. The LZ-A1 method is non-blocking in the sense that it does not block the caller's context to perform zeroing of blocks or zeroing metadata operations.

One or more embodiments of the LZ-S1 method or the LZ-A1 method have an advantage in that blocks of pre-allocated file(s) do not need to be zeroed out at the time the file(s) are created. Rather, the blocks are zeroed out only when an associated application first issues a request to write to the blocks. However, according to the LZ-S1 and LZ-A1 methods, the entire blocks are zeroed out when the associated application first issues a request to write to the blocks, including sectors of the blocks to which the application may never write. This may adversely affect performance of sequential write workloads, because block zeroing is redundant in the sense that the zeroed region of the block will almost immediately be overwritten, at step 522, with valid application data. In addition, some sectors are zeroed out even if they may never be written to by the application.

Delayed Block Zeroing on Write

Figure 6:
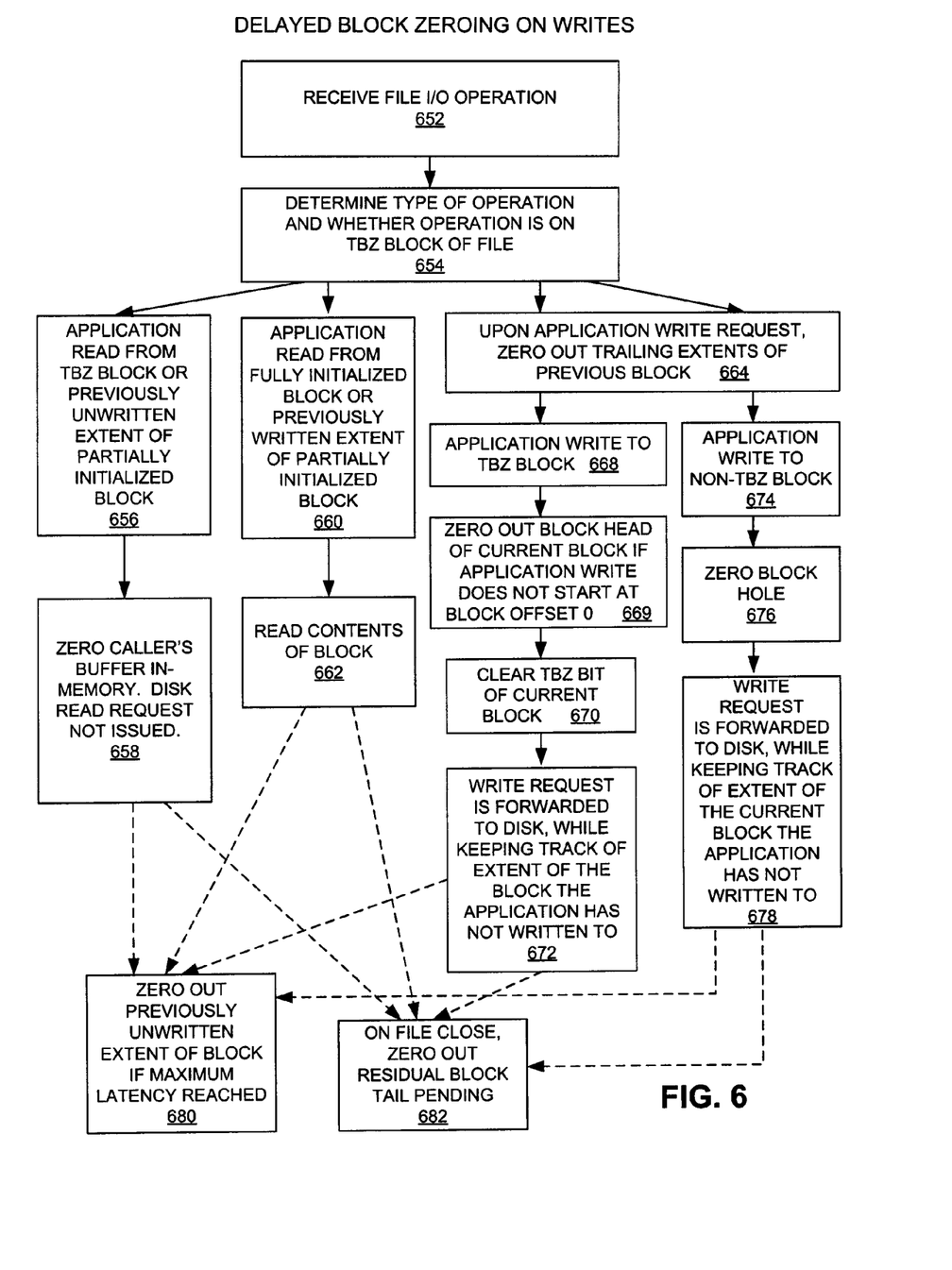
FIG. 6 is a flow chart that illustrates how one or more embodiments operate in accordance with a second aspect of the present invention, i.e., a Delayed Block Zeroing on Write method of zeroing blocks of a pre-allocated file.

FIG. 6 is a flow chart that illustrates how one or more embodiments operate in accordance with a second aspect of the present invention, i.e., a Delayed Block Zeroing on Write method of zeroing blocks of a pre-allocated file. According to the Delayed Block Zeroing on Write method, zeroing of an un-initialized file block is delayed in anticipation of a sequential write. As such, block(s) are not zeroed out when a pre-allocated file is created, and block(s) are not zeroed out even when an application first writes to the block(s). Rather, the file system (for example file system 64 of FIG. 1, or VMFS 64 of FIG. 2A) keeps track of the last extent of a block the application has written to, and delays zeroing out of remaining extents of the block until the application writes to another block or to other extents of the block beyond the last written extent within the block. Here, the term "extent" refers to a block of data within file 50 on disk 16 with a given length and starting file offset. As a result, it may be possible to eliminate many writes where zero writes may not be needed. In the best case where an entire file is written out sequentially, it is possible to eliminate all zero writes. The Delayed Block Zeroing on Write method may be embodied in a variety of forms, including, without limitation, a Delayed Synchronous Block Zeroing on Write (LZ-SD) method and a Delayed Asynchronous Block Zeroing on Write (LZ-AD) method, either of which can be combined with Speculative Block Zeroing. In the following description, it is assumed that a pre-allocated file is created without its blocks being zeroed at the time the pre-allocated file is created, and that TBZ bits corresponding to blocks of the file are set. In the description below, the term "initialized block" means a file block that contains application data and/or has been initialized, for example, with zeroes, sometime earlier.

Delayed Synchronous Block Zeroing on Write (LZ-SD)

Referring to FIG. 6, at step 652, a file I/O operation is received. At step 654, the type of operation requested and whether the requested operation relates to a TBZ block of the file (i.e., whether the TBZ bit corresponding to the block to be accessed is set) is determined. Again, note that the file I/O operation could span multiple blocks of file 50, in which case the file I/O operation may be split up before step 654, and the remaining steps of the method shown in FIG. 6 may be performed with respect to each fragment of the split up file I/O operation.

At step 656, if the file I/O operation is an application read from a TBZ block or a previously unwritten extent of a partially initialized block, at step 658, the application read is serviced by zeroing the caller's buffer in-memory. A disk read request is not issued because the TBZ block has never been written to, nor zeroed out, and may contain data from another application. On the other hand, at step 660, if the file I/O operation is an application read from a non-TBZ block or a previously written part of a partially initialized block, at step 662, the application read is serviced by reading the contents of the block, i.e., a disk read request is issued.

At step 664, upon receiving an application write request, trailing extents of a previous block (i.e., a block earlier in sequence than the current block to be accessed by the current write request) are zeroed out, and TBZ bits corresponding to the previous blocks are cleared. Then, at step 668, if the file I/O operation is an application write to a TBZ block, at step 669, the block head of the current block is zeroed out if the application write does not start at block offset 0 (i.e., at the beginning) of the current block, at step 670, the TBZ bit of the current block is cleared, and, at step 672, the write request is forwarded to the disk while keeping track of the extent of the block the application has not written to. The extent of the block that the application has not written to is tracked using a block tracker (tbzBlockNum) and a block offset tracker (tbzBlockOffset), as will be explained below with reference to FIG. 7.

Thus, the current block to which the application writes is not zeroed out. Instead, in-memory trackers such as a block tracker (tbzBlockNum) and a block offset tracker (tbzBlockOffset) are used to record the extent of the current block that the application has not yet written to, with an aim to zero this un-initialized part at a later time, or to overwrite it with subsequent application writes (if any), whichever is earlier. Note that the TBZ bit of the current block is cleared, even though part of the current block may contain garbage data (i.e., it is not zeroed out and does not contain data written by the application). Such a block that has a region that was not zeroed out or written to by the application is a partially initialized block, and the non-initialized region of the partially initialized block is zeroed out in subsequent write requests in step 664 or is overwritten by subsequent writes, whichever is earlier. Note that the in-memory trackers should be committed to the file descriptor when they change in step 672, so that the delayed zeroing state can be restored in case the system crashes, and the delayed zeroing needs to resume after a restart.

Also note that in the LZ-SD method, the block is zeroed out in step 664 and the TBZ bit is cleared in step 670 synchronously in the caller's context, while the write request is held (for example, in VMKernel 78 of FIG. 2A). "Synchronously" herein means that the caller's context is blocked on the I/O operation, and is not scheduled on a CPU until the I/O operation is completed successfully or unsuccessfully. If the zeroing operation of step 664 succeeds, the TBZ bit corresponding to the block is cleared (for example, reset) at step 670; in the LZ-SD method this occurs synchronously in the caller's context. If the TBZ bit is cleared successfully, then, at step 672, the original application write request is forwarded to the disk to be written to file 50.

After zeroing the trailing extents of previous blocks at step 664, if the file I/O operation is an application write to a non-TBZ block at step 674, at step 676, the block hole of the current block is zeroed out. In other words, at step 676, if the application write starts at an offset beyond the extent of the previous application write to the current block, the extent between the end of the extent of the previous application write and the starting offset of the current application write is zeroed out. Then, at step 678, the application write request is forwarded to disk 16 so that it is written to the file while keeping track of the extent of the current block to which the application has not written. Again, the part of the current block that the application has not written to is tracked using a block tracker (tbzBlockNum) and a block offset tracker (tbzBlockOffset), as will be explained below with reference to FIG. 7.

Since TBZ writes to the block are not done synchronously with triggering application writes in the LZ-SD method (i.e., block tails are zeroed at step 664 only during file write), it may be the case that the tail portion of a TBZ block may not be zeroed for a long period of time if the application stops issuing new writes. Thus, it is beneficial to maintain a periodic flush thread to ensure that there is an upper bound on the delayed zeroing latency in the LZ-SD method. This latency is the time for which the TBZ markers refer to a given block and an offset within that block, i.e., the period of time during which the TBZ bit of a block is cleared, but the block has not yet been fully initialized. As delayed zeroing latency is reduced closer to 0, the LZ-SD method tends to provide results similar to results provided by the LZ-S1 method.

Therefore, in step 680, when the maximum latency corresponding to a block is reached, the previously un-initialized extent of the block is zeroed out.

In addition, a delayed zero write to the trailing extent of a previously written block might be pending at the time of a file close request. These zero writes, if any, need to be flushed out synchronously when the file is closed. Thus, at step 682, on file close, any residual block tail that is pending after the last write is zeroed out.

Figure 7:
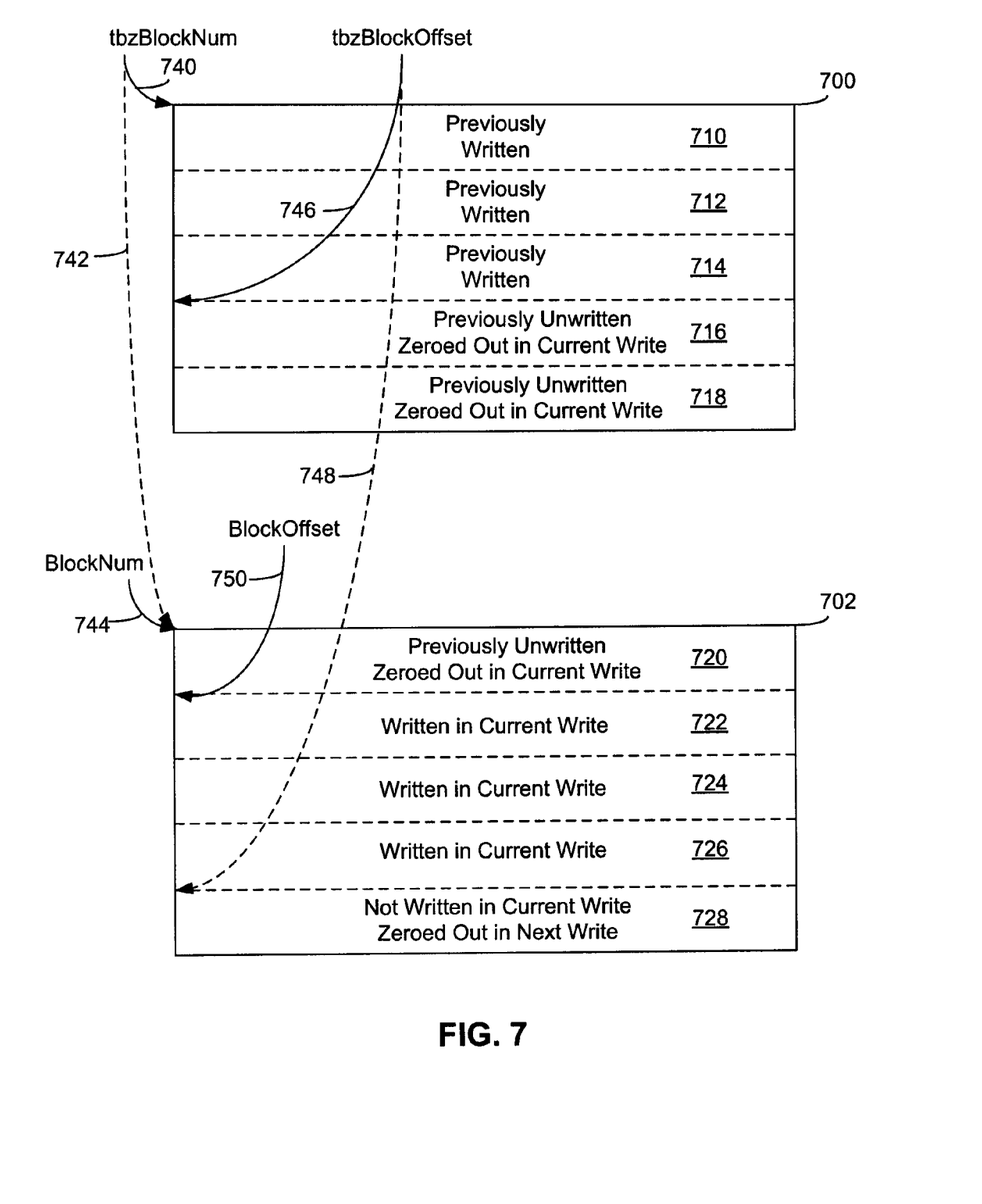
FIG. 7 shows how blocks of a pre-allocated file are zeroed in a previous write operation, a current write operation, and a next write operation according to one or more embodiments of the second aspect of the present invention described in conjunction with FIG. 6.

FIG. 7 shows how blocks of a pre-allocated file are zeroed in a previous write operation, a current write operation, and a next write operation according to one or more embodiments of the second aspect of the present invention described above in conjunction with FIG. 6. FIG. 7 shows two blocks 700, 702 of a pre-allocated file; block 700 includes sectors 710, 712, 714, 716, 718 and block 702 includes sectors 720, 722, 724, 726, 728. Note that the number of sectors illustrated in FIG. 7 is much smaller than reality, for ease of illustration.

Referring to FIG. 7 in conjunction with FIG. 6, sectors 710, 712, 714 of block 700 are shown as having been previously written, for example, at step 672 (shown in FIG. 6). Block 700 would be a non-TBZ block as a result of the previous write. Tracker tbzBlockNum 740 points to block 700 of the previous write request, and tracker tbzBlockOffset 746 points to sector 714 of block 700, i.e., the sector at which the previous write ended within block 700. FIG. 7 further shows receiving a write request, at step 652 (shown in FIG. 6), to the file at a location pointed to by block number BlockNum 744 and sector number BlockOffset 750 within block 702 pointed to by BlockNum 744. As further shown in FIG. 7, trailing sectors 716, 718 between the sector pointed to by tbzBlockNum 740, tbzBlockOffset 746 and the end of block 700 were previously unwritten, but are now zeroed out in the current write, at step 664 (shown in FIG. 6).

As further shown in FIG. 7, sector 720 of block 702 was also not written previously. At step 669 (shown in FIG. 6), the block head (i.e., sector 720) of block 702 is zeroed out because the application write does not start at block offset 0 of block 702, i.e., because BlockOffset 750 points to sector 722. Then, at step 670 (shown in FIG. 6), the TBZ bit corresponding to block 702 is cleared, and, at step 672 (shown in FIG. 6), the write request is forwarded so that certain sectors 722, 724, 726 of the block 702 are written to by the current write request. Note that the trackers will move to tbzBlockNum 742, tbzBlockOffset 748 to indicate to file system 64 that tail sector 728 of block 702 has not been zeroed out yet, so that it can be zeroed out during the next write request at step 664 (shown in FIG. 6).

Note that the number of TBZ trackers tbzBlockNum and tbzBlockOffset per file can be increased to generate concurrent threads keeping track of parts of the block rather than the whole block to improve the throughput of concurrent threads writing to different parts of a newly created file.

Delayed Asynchronous Block Zeroing on Write (LZ-AD)

The LZ-AD method is an embodiment of an asynchronous version of the Delayed Synchronous Block Zeroing on Write method. In accordance with the LZ-AD method, block zeroing and corresponding metadata changes are performed via asynchronous I/O so that a caller application is not blocked during the zeroing operations. Otherwise, the same steps for the method of FIG. 6 as explained above with respect to the LZ-SD method are carried out for the LZ-AD method. Thus, in accordance with the LZ-AD method, steps 664, 669, 670, 672, 676, and 678 shown in FIG. 6 are carried out by issuing asynchronous requests corresponding to these steps. Therefore, the caller context is free to do other work while these steps 664, 669, 670, 672, 676, and 678 are carried out.

One or more embodiments of the LZ-SD method or the LZ-AD method have an advantage in that zeroing out of remaining extents of a partially initialized block is delayed until the application writes to another block or to other extents of the block beyond the last extent of the block.

Speculative Synchronous Block Zeroing on Writes (LZ-SS)

In LZ-SS, upon receiving a write request to an un-initialized block i, this method will zero out block i and the next N blocks (i+1, . . . , i+N), where N is a configurable parameter, in speculation that the application follows a sequential access pattern and will access the next few blocks very soon. Choosing the extra blocks to be zeroed out is a matter of policy. In other words, if the application is expected to generate random writes, a higher N will not help. Rather, in that case, it might be advantageous not to speculate, or to choose N random blocks rather than N contiguous blocks. LZ-SS can be used in conjunction with any one of LZ-S1, LZ-A1, LZ-SD, LZ-AD.

Speculative Asynchronous Block Zeroing on Writes (LZ-AS):

In accordance with one or more embodiments of a third aspect of the present invention, i.e., an LZ-AS method, one or more background threads are used to zero out TBZ blocks in open files. In accordance with one or more such embodiments, the thread uses idle storage bandwidth to zero out blocks. The LZ-AS method can be used in conjunction with any one of the LZ-S1 method, the LZ-A1 method, the LZ-SD method, or the LZ-AD method.

Figure 8A:
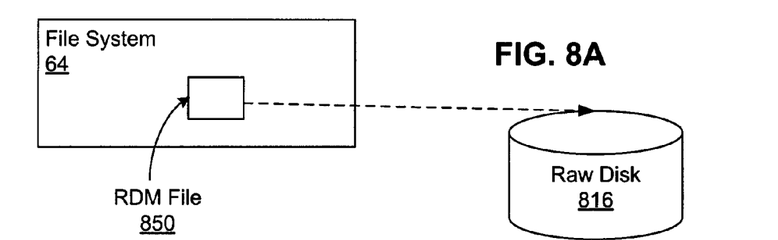
FIG. 8A illustrates a raw device mapping (RDM) file representing a raw disk.

As can be seen from the above description, one or more embodiments of the present invention can be utilized to postpone initializing any type of pre-allocated files such as, for example and without limitation, raw device mapping (RDM) files or even non-preallocated sparse files. An RDM file is a file that represents a raw disk. FIG. 8A illustrates an RDM file representing a raw disk. As shown in FIG. 8A, file system 64 contains RDM file 850 that would represent raw disk 816. Details of RDM files can be found in U.S. Pat. No. 7,155,558, issued on Dec. 26, 2006 to Vaghani, et al., which patent is incorporated by reference herein in its entirety. Since RDM files are types of pre-allocated files, one or more embodiments of the present invention, including those described herein may be used to postpone zeroing RDM files if they are modified to contain TBZ bits as described herein.

Figure 8B:
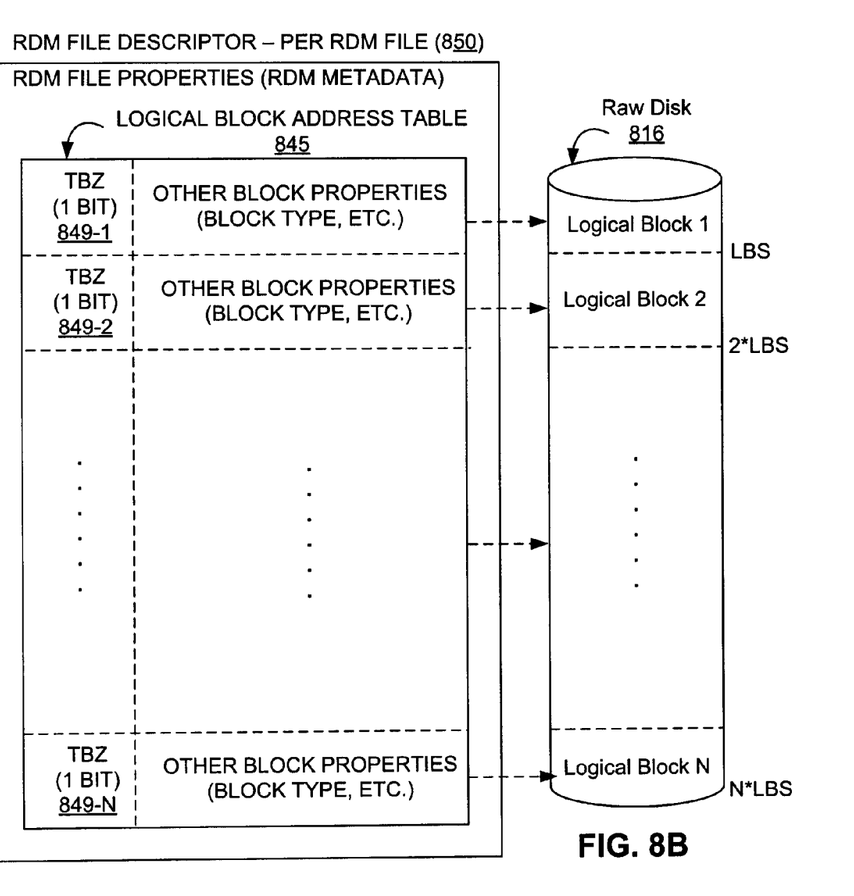
FIG. 8B illustrates the structure of a file descriptor of an RDM file in accordance with one or more embodiments of the present invention.

FIG. 8B illustrates the structure of a file descriptor of an RDM file in accordance with one or more embodiments of the present invention. The RDM file descriptor is a data structure used, for example, by file system 64 of FIG. 1 or VMFS 64 of FIG. 2A, to manage various properties (for example, RDM metadata) of RDM file 850. The RDM file descriptor is similar to the file descriptor shown in FIG. 4 corresponding to pre-allocated file 50. Each RDM file 850 has a corresponding file descriptor, except that the block address table is logical block address table 845 that contains block properties corresponding to logical blocks of raw disk 816. Specifically, the file descriptor includes logical block address table 845 that contains a list of block properties corresponding to logical blocks (Logical Block 1, Logical Block 2, . . . , Logical Block N) of raw disk 816. Each logical block has a logical block size (LBS) where LBS=Size of Raw Disk/N. In addition, in accordance with one or more embodiments of the present invention, logical block address table 845 stores To-Be-Zeroed (TBZ) bits 849-1, 849-2, . . . , 849-N per logical block. Each TBZ bit 849-1, 849-2, . . . , 849-N is a 1 bit flag indicating whether the corresponding logical block of the RDM file is to be zeroed. Setting the TBZ bit (e.g., setting it to "1") for a RDM logical block indicates that the corresponding RDM logical block has never been written to by an application associated with RDM file 850, or in other words, that the corresponding RDM logical block may contain garbage if read from physical media and is to be zeroed. If the TBZ bit is not set, that means that the corresponding RDM logical block has been written to by the application associated with RDM file 850, and thus it is safe to read data from that logical block. When RDM file 850 is created, TBZ bits corresponding to all logical blocks that are allocated but not zeroed are set.

Since the RDM file has logical block address table 845 which is substantially the same as block address table 145 for pre-allocated files, one or more embodiments of the present invention, including embodiments of the methods as described above in conjunction with FIGS. 5 and 6, may be used to postpone zeroing the logical blocks of RDM file 850. Whenever one or more embodiments of the methods described above in conjunction with FIGS. 5 and 6 are used with RDM files, the offset for accessing a logical block would be in units of integer multiples of LBS, and the length of a raw disk I/O operation would be in the units of LBS. Otherwise, such embodiments could be applied readily to zeroing of logical blocks of RDM file 850.

Upon reading this disclosure, those of skill in the art will appreciate still additional alternative embodiments of zeroing of pre-allocated files may be fabricated. For example, although embodiments have been described herein in the context of a file system of a virtualized computer system, such embodiments are not limited to use in a virtualized computer system and may be used to in any type of computer system. For another example, one or more of the embodiments can be carried out in a hardware-assisted manner in an environment where storage systems (disk arrays) or storage intermediaries (switches) can be programmed. The zeroing can be performed synchronously or asynchronously with the actual data write that triggers it. The zeroing can be done in the context of the triggering write and its application, or can be deferred to a helper context. In addition one or more embodiments of the present invention can be implemented on distributed or non-distributed file-systems with zeroing logic implemented in a central metadata server or distributed across file system clients. Further one or more of the above-described embodiments can be modified to not zero out only those regions of a TBZ file block that correspond to the triggering application write. Still further, one or more of the above-described embodiments of the present invention can also be used to zero out file holes in conventional non-preallocated files, or to zero out other pre-allocated entities such as hard disks, databases, physical extents in logical volumes, etc.

One or more embodiments of the present invention may be used in hosted and non-hosted virtualized computer systems (regardless of the degree of virtualization) in which virtual machine(s) have any number of physical and/or logical virtualized processors. In addition, one or more embodiments of the present invention may be used in a non-virtualized computer system. In further addition, one or more embodiments of the present invention may be implemented directly in a computer's primary operating system (OS), both where the OS is designed to support virtual machines and where it is not. Moreover, one or more embodiments of the present invention may be implemented wholly or partially in hardware, for example in processor and storage architectures intended to provide hardware support for virtual machines.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of postponing initialization of blocks of a virtual disk for a virtual machine that is running in a host system, the virtual disk being stored as a virtual disk file in a storage system connected to the host system, the method comprising:
    creating a file descriptor for the virtual disk file, wherein the file descriptor comprises entries for data blocks that have been allocated to the virtual disk file, each entry including an indicator as to whether a corresponding data block has been previously initialized;
    receiving a virtual write operation for the virtual disk from the virtual machine;
    upon receiving the virtual write operation for the virtual disk, consulting indicators in the file descriptor for the virtual disk file for a data block corresponding to the virtual write operation to assess whether the data block should be initialized prior to executing the virtual write operation;
    writing data into portions of the data block that are specified by the write operation;
    initializing any uninitialized portions of the data block that precede the portions of the data block that are specified by the write operation; and
    upon completion of the write operation, maintaining a reference that indicates a position in the data block after which portions of the data block have not been initialized or written to.

2. The method of claim 1, further comprising:
    receiving a virtual read operation that specifies portions of a data block that are uninitialized; and
    executing the virtual read operation by returning zero values for the specified portions rather than forwarding the read operation to a storage device to read data from the specified portions of the data block.

3. The method of claim 1, wherein the file represents at least of portion of a virtual disk for use with a virtual machine.

4. The method of claim 1, wherein a portion of a data block is initialized by writing either data relating to an I/O operation into the portion or by writing zeros into the portion.

5. The method of claim 4, further comprising writing zeros into any uninitialized portions of a preceding data block that (i) is not subject to the write operation, and (ii) has at least one portion that has been initialized.

6. A non-transitory computer-readable storage medium including instructions that, when executed on a computer processor, causes the computer processor to postpone initialization of blocks of a virtual disk for a virtual machine that is running on a host system, the virtual disk being stored as a virtual disk file in a storage system connected to the host system, by performing a method comprising the steps of:
    creating a file descriptor for the virtual disk file, wherein the file descriptor comprises entries for data blocks that have been allocated to the virtual disk file, each entry including an indicator as to whether a corresponding data block has been previously initialized;
    receiving a virtual write operation for the virtual disk from the virtual machine;
    upon receiving the virtual write operation for the virtual disk, consulting indicators in the file descriptor for the virtual disk file for a data block corresponding to the virtual write operation to assess whether the data block should be initialized prior to executing the virtual write operation;

writing data into portions of the data block that are specified by the write operation;

initializing any uninitialized portions of the data block that precede the portions of the data block that are specified by the write operation; and upon completion of the write operation, maintaining a reference that indicates a position in the data block after which portions of the data block have not been initialized or written to.

7. The computer-readable storage medium of claim 6, wherein the method further comprises the steps of:

receiving a virtual read operation that specifies portions of a data block that are uninitialized; and executing the virtual read operation by returning zero values for the specified portions rather than forwarding the read operation to a storage device to read data from the specified portions of the data block.

8. The computer-readable storage medium of claim 6, wherein the file represents at least of portion of a virtual disk for use with a virtual machine.

9. The computer-readable storage medium of claim 6, wherein a portion of a data block is initialized by writing either data relating to an I/O operation into the portion or by writing zeros into the portion.

10. The computer-readable storage medium of claim 9, wherein the method further comprises the step of writing zeros into any uninitialized portions of a preceding data block that (i) is not subject to the write operation, and (ii) has at least one portion that has been initialized.

11. A computer system comprising a processor configured to postpone initialization blocks of a virtual disk for a virtual machine that is running in a host system, the virtual disk being stored as a virtual disk file in a storage system connected to the host system, by performing the steps of:

creating a file descriptor for the virtual disk file, wherein the file descriptor comprises entries for data blocks that have been allocated to the virtual disk file, each entry including an indicator as to whether a corresponding data block has been previously initialized;

receiving a virtual write operation for the virtual disk from the virtual machine;

upon receiving the virtual write operation for the virtual disk, consulting indicators in the file descriptor for the virtual disk file for a data block corresponding to the virtual write operation to assess whether the data block should be initialized prior to executing the virtual write operation;

writing data into portions of the data block that are specified by the write operation;

initializing any uninitialized portions of the data block that precede the portions of the data block that are specified by the write operation; and upon completion of the write operation, maintaining a reference that indicates a position in the data block after which portions of the data block have not been initialized or written to.

12. The computer system of claim 11, wherein the processor is further configured to perform the steps of:

receiving a virtual read operation that specifies portions of a data block that are uninitialized; and executing the read operation by returning zero values for the specified portions rather than forwarding the read operation to a storage device to read data from the specified portions of the data block.

13. The computer system of claim 11, wherein a portion of a data block is initialized by writing either data relating to an I/O operation into the portion or by writing zeros into the portion.

14. The computer system of claim 13, wherein the processor is further configured to perform the step of writing zeros into any uninitialized portions of a preceding data block that (i) is not subject to the write operation, and (ii) has at least one portion that has been initialized.

* * * * *